(12) United States Patent
Jung (10) Patent No.: US 8,543,933 B2
(45) Date of Patent: Sep. 24, 2013

(54) SLIDESHOW DISPLAY OF IMAGES FOR USER-DEFINED GROUPS OF APPLICATIONS

(75) Inventor: Nae Kwon Jung, Seoul (KR)

(73) Assignee: Emtrace Technologies USA, Inc., San Jose, CA (US)

( * ) Notice: Subject to any disclaimer, the term of this patent is extended or adjusted under 35 U.S.C. 154(b) by 1189 days.

(21) Appl. No.: 12/035,173

(22) Filed: Feb. 21, 2008

(65) Prior Publication Data

US 2009/0217198 A1  Aug. 27, 2009

(51) Int. Cl.
*G06F 3/048* (2013.01)

(52) U.S. Cl.
USPC .......... 715/766; 715/767; 715/779; 715/781; 715/783; 715/793; 715/802; 715/804

(58) Field of Classification Search
USPC ............... 715/804, 766, 767, 779, 781, 783, 715/802
See application file for complete search history.

(56) References Cited

U.S. PATENT DOCUMENTS

| | | | | |
|---|---|---|---|---|
| 5,075,675 A | * | 12/1991 | Barker et al. ............... | 715/794 |
| 5,377,317 A | * | 12/1994 | Bates et al. ................. | 715/789 |
| 6,300,951 B1 | * | 10/2001 | Filetto et al. ................ | 715/797 |
| 6,462,757 B1 | * | 10/2002 | Kao et al. .................... | 715/783 |
| 7,159,189 B2 | * | 1/2007 | Weingart et al. ............ | 715/799 |
| 7,503,010 B2 | * | 3/2009 | Chaudhri et al. ........... | 715/764 |
| 7,765,143 B1 | * | 7/2010 | West ............................ | 705/37 |
| 2004/0107439 A1 | * | 6/2004 | Hassell et al. ............... | 725/44 |
| 2006/0041846 A1 | * | 2/2006 | Masselle et al. ............ | 715/793 |
| 2006/0161861 A1 | * | 7/2006 | Holecek et al. ............. | 715/782 |
| 2007/0220441 A1 | * | 9/2007 | Melton et al. ............... | 715/781 |
| 2010/0115461 A1 | * | 5/2010 | Onda et al. .................. | 715/790 |
| 2010/0122162 A1 | * | 5/2010 | Terada et al. ............... | 715/702 |

FOREIGN PATENT DOCUMENTS

| | | | |
|---|---|---|---|
| JP | A-8-161139 | * | 6/1996 |
| KR | 10-2008-0004077 | | 1/2008 |
| KR | 10-2008-0013418 | | 2/2008 |
| KR | 10-2008-0024335 | | 3/2008 |

OTHER PUBLICATIONS

"Chumby Software Applications, Scripts and Tools," ChumbyWiki, May 15, 2008, [online] [Retrieved on Jun. 25, 2008] Retrieved from the internet <URL:http://wiki.chumby.com/mediawiki/index.php/Chumby_Software_Applications%2C_Scripts_and_Tool>.

"Chumby Store," Chumby Industries Inc., Jun. 25, 2008 [online] [Retrieved on Jun. 25, 2008] Retrieved from the internet <URL:http://store.chumby.com/>.

(Continued)

*Primary Examiner* — Weilun Lo
*Assistant Examiner* — Dino Kujundzic
(74) *Attorney, Agent, or Firm* — Fenwick & West LLP (57) ABSTRACT

A group is defined by a user to include two or more different applications executed on a computing device. The group is associated with one foreground window and one or more background windows on a screen of the computing device. Images of one application selected as a foreground application is displayed in the foreground window. The applications not selected as the foreground application displays images in the background windows. The foreground window is overlaid on the top of the windows of other applications, thereby partially or totally occluding the windows of other applications in the same group. The foreground application changes with elapse of time or upon detection of an event. Therefore, the same foreground window display images for different applications in the group at different times. The number of windows cluttering a screen of the application can be reduced because the user can interact with different applications in the group using the same foreground window.

22 Claims, 4 Drawing Sheets

(56) References Cited

OTHER PUBLICATIONS

"Chumby tricks," ChumbyWiki, Jun. 16, 2008, [online] [Retrieved on Jun. 25, 2008] Retrieved from the internet <URL:http://wiki.chumby.com/mediawiki/index.php?title=Chumby_tricks&oldid=1858>.

"FlashDevelop/FlikrPhotoViewer", ChumbyWiki, Jan. 15, 2008, [online] [Retrieved on Jun. 25, 2008] Retrieved from the internet <URL: http://wiki.chumby.com/mediawiki/index.php?title=FlashDevelop/FlickrPhotoViewer&oldid=1916>.

* cited by examiner

SLIDESHOW DISPLAY OF IMAGES FOR USER-DEFINED GROUPS OF APPLICATIONS

BACKGROUND OF THE INVENTION

1. Field of the Invention

The present invention relates to displaying images associated with applications on a screen of a computing device, and more specifically, to automatically changing applications that actively display images on a window of a screen.

2. Description of the Related Art

As the capacity and performance of computing devices are enhanced, more and more applications are executed simultaneously on the computing devices. Some of these applications display images on the screen of the computing device in the form of windows to convey information to users or to interact with the users. As more applications are executed simultaneously on the computing device, the screen of the computing device becomes cluttered with numerous windows that compete for space on the screen. Although the size of each window may be small, the aggregate space taken up by the windows may add up to a considerable portion of the screen. Consequently, the user may need to minimize, inactive or close windows of certain applications that are less frequently used or not of immediate interest to the user in order to preserve screen space.

The applications displaying images on the screen could be widgets. Widgets are applications, typically of small data sizes, that provide information to the user associated with frequently used functions such as clocks, calendars, news readers, and stock tickers. Widgets are often registered with a widget engine running on a computing device to provide a platform on which various widgets can be executed. Most widgets generate windows on the screen to display images and convey information to the users. One distinguishing feature of such widgets is that the widgets often convey limited information about a certain subject. This means that multiple widgets need to be executed in order to convey various types of information to the user.

When multiple widgets are executed, it may become confusing for the user to find a particular window associated with a certain widget. In order to alleviate such confusion, many widget engines allow the windows for the widgets to be tiled in an organized manner. By tiling the windows of the widgets, however, the space on the screen taken up by the windows of the widgets is increased. Another way of arranging the widgets is by cascading the windows of the widgets. Cascading the windows has the advantage of reducing the screen space occupied by the windows, but the user must still manually sort through the windows to find the information the user wants.

The problem is exacerbated in mobile computing devices such as a smartphone or a PDA (Personal Digital Assistant). Such mobile computing devices have very limited screen sizes. Therefore, the screen of mobile computing device quickly becomes occupied with windows after several applications are executed. Once the screen becomes filled with multiple windows, the user may need to navigate through a maze of windows, minimize the windows or deactivate the windows to find a particular window the user wants to view or interact with.

SUMMARY OF THE INVENTION

Embodiments of the present invention include a computer readable storage medium, a method and a computing device that receive a user-selected definition of a group including two or more different applications. The group is associated with one foreground window and one or more background windows. The user-selected definition includes a sequence by which the two or more different applications are to be displayed in the foreground window. A foreground application that displays its images in the foreground window of the group changes responsive to detecting elapse of a predetermined amount of time. Therefore, the foreground window of the group displays images for different applications of the group at different times.

In one embodiment, images for applications in the group other than the foreground application (background applications) may be displayed in the background windows. The background windows are overlaid partially or entirely by the foreground window of the same group. The images generated by the background applications of the group are not displayed on the screen or partially displayed on the screen, freeing up space available on the screen for other applications or operations.

In one embodiment, the different applications in the group communicate with different remote servers via a network. The different applications are adapted to receive and process information received from certain remote servers and not other remote servers.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

A foreground window refers to a window assigned to each group of applications for displaying full images of one foreground application selected from a group of applications. The foreground window is overlaid on the top of windows displaying images of other applications (i.e., background applications) in the same group, thereby occluding the windows (i.e., background windows) of the other applications entirely or partially. The foreground window serves as a primary display window for all of the applications in the group.

The foreground application refers to an application in the group that currently displays its images in the foreground window. The foreground application does not necessarily indicate that it has the highest priority in the group. Any applications in the group may become the foreground application as time elapses or as other events are detected.

The background application refers to any applications in the group that is not currently displaying its images in the foreground window. In one or more embodiments, the images of the background applications are displayed in the background windows that may be completely or partially overlaid by the foreground window.

Figure 1A:
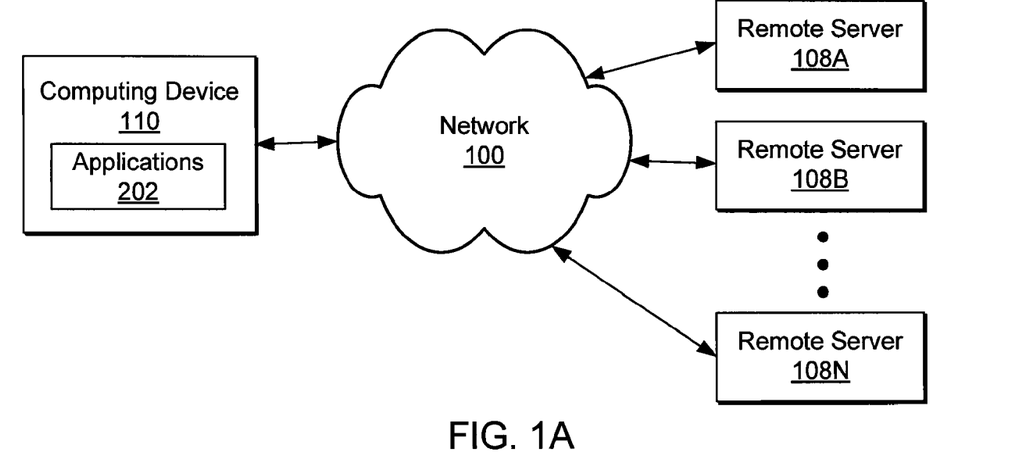
FIG. 1A is a schematic diagram illustrating a computing device communicating with remote servers, according to one embodiment of the present invention.

FIG. 1A is a schematic diagram illustrating a computing device 110 communicating with a remote server 108 over a network, according to one embodiment of the present invention. The computer device 110 stores software codes for two or more different applications 202 that may be loaded and executed simultaneously on the computing device 110. In one or more embodiments, the applications 202 interact with or receive information from certain remote servers. In one embodiment, different applications 202 communicate and interact with different remote servers 108A through 108N.

The network 100 may be various types of communication network including wireless and wired communication network such as PSTN (Public Switched Telephone Network) network, cable television network, cellular phone network, and satellite communication network. The network may be a part of the Internet or provide connection to the Internet.

The remote servers 108A through 108N are servers that provide various types of services and information. In one or more embodiments, the remote servers 108A through 108N host websites that provide information to the computing device 110 via TCP/IP (Transmission Control Protocol/Internet Protocol) and HTTP (Hypertext Transfer Protocol) (or HTTPS (Hypertext Transfer Protocol Secure)) protocol. The remote servers 108A through 108N aggregate data from one or more sources and send the data to the computing device 110.

Figure 1B:
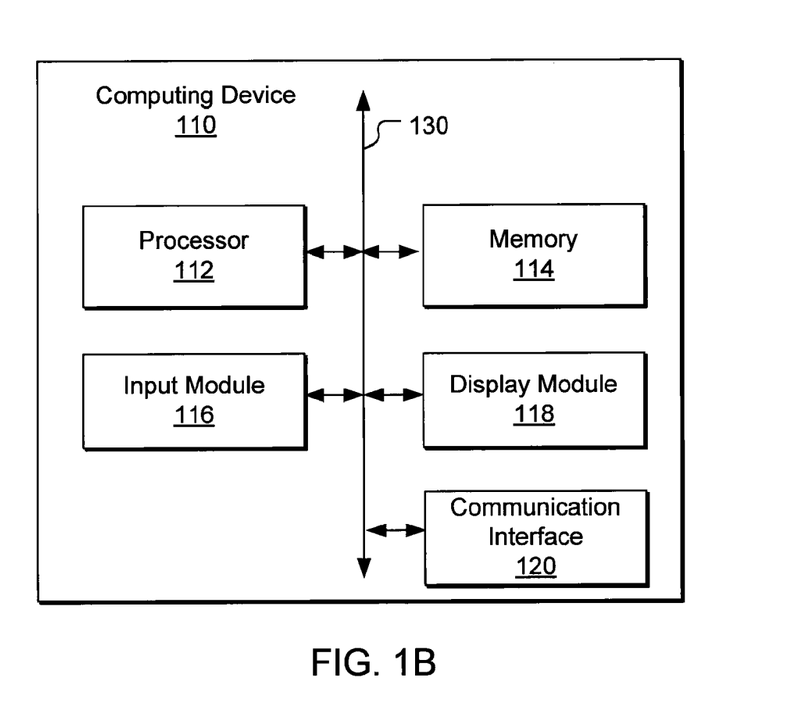
FIG. 1B illustrates the hardware system of a computing device, according to one embodiment of the present invention.

FIG. 1B illustrates a computing device 110 for executing a plurality of different applications, according to one embodiment of the present invention. The computing device 110 may be one of various devices such as a personal computer, a laptop computer, an e-book reader, an electronic picture frame, a desktop widget player, a PDA (Personal Digital Assistant), an MP3 player, a stand-alone multimedia player (e.g., Divx player), and a cellular phone. The computing device 110 has a multi-tasking capability that allows the computing device 110 to execute two or more applications simultaneously.

The computing device 110 includes, among other modules, a processor 112, a memory 114, an input module 116, a display module 118, and a communication module 120. Not all components of the computing device 110 are shown in FIG. 1B and certain components not necessary for illustration of the present invention (for example, audio speakers) are omitted herein. Each component of the computing device 110 may be communicatively coupled through a bus 130. Each component of the computing device 110, whether alone or in combination with other components, can be implemented for example, in software, hardware, firmware or any other combination thereof.

The processor 112 is a conventional processor or controller such as Intel® Pentium processor, an ARM9 type processor or an Intel® XScale® processor. The processor 112 reads and executes instructions and/or data stored in the memory 114. The instructions and/or data executed on the processor 112 include codes for performing any techniques described herein. In one embodiment, the memory 114 is a dynamic random access memory (DRAM) device, a static random access memory (SRAM) device, or some other conventional memory device.

The input module 116 is a user interface device such as a mouse, a trackball, a stylus, a pen, a touchscreen, a keyboard or other mechanisms for receiving user inputs associated with manipulation of the applications executed on the computing device 110. The user input is received via the input module 116 to manipulate, for example, a pointer or a cursor appearing on the screen of the display module 118.

The display module 118 may include display devices such as a liquid crystal display (LCD) or a cathode ray tube (CRT) monitor for displaying a screen that can be viewed by the user. The screen of the display module 118 may display multiple windows associated with the applications executed on the computing device 110.

The communication interface 120 may include one or more wired or wireless communication interfaces used to communicate with the remote server 108 over a network. For example, the communication interface 120 may include an Ethernet (e.g., 10Base-T0 interface and/or a Wi-Fi interface (e.g., IEEE 802.11b/g)) for communication with the remote server 108 via the Internet 100.

Figure 2:
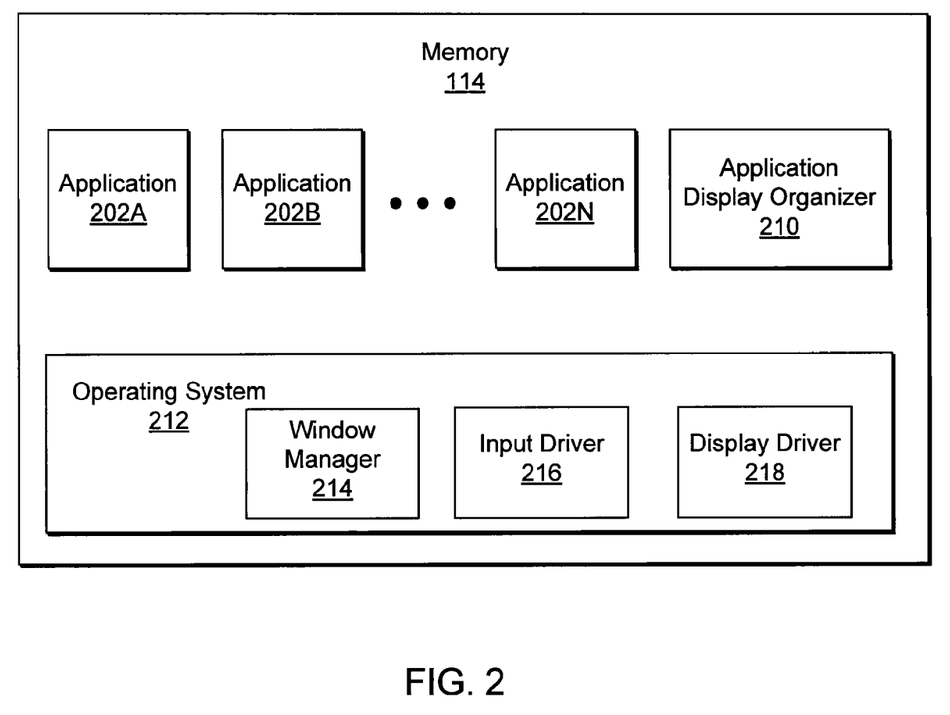
FIG. 2 illustrates software modules in the memory of the computing device, according to one embodiment of the present invention.

FIG. 2 illustrates the software modules of the memory 114 in a computing device 110, according to one embodiment of the present invention. The memory 114 stores, among others, applications 202A through 202N, an application display organizer 210, and an operating system (O/S) 212. The applications 202A through 202N may be various programs adapted to run on the computing device 110.

In one embodiment, the applications 202A through 202N include one or more widgets. The widgets are small applications that provide information to the user associated with frequently used functions such as clocks, calendars, news aggregators, and stock tickers. The widgets may communicate with a remote server to receive information via the communication interface 120. In one embodiment, each widget (or application) communicates with different remote servers 108A through 108N. For example, a stock ticker widget receives information from a remote server hosting a stock brokerage website and a weather monitoring widget receives information from a remote server hosting a website related to weather.

Different widgets providing different information are different applications even though the widgets may run on the same widget engine. For example, a widget providing weather updates and another widget providing news updates are different applications. Further, widgets having the same software code but configured to provide different information are also defined as different applications herein.

The application display organizer 210 is a software component that manages and coordinates displaying of images associated with the applications 202A through 202N on the screen of the display module 118. The application display organizer 210 operates in conjunction with a window manager 214 in the operating system 212 to display the images of the applications 202A through 202N in a foreground window and/or background windows of the group, as described below in detail with reference to FIGS. 3 and 4. In one embodiment, the application display organizer 210 is a widget engine providing a platform on which multiple widgets can be executed.

The application display organizer 210 includes software codes associated with user inputs that define arbitrary groups of applications 202A through 202N. The user may select and group two or more applications 202A through 202N, ungroup the applications 202A through 202N that are already grouped or modify the applications included in the group. It may be convenient for the user to manage the applications 202A through 202N if the applications are grouped according to certain criteria. For example, the user may group applications that provide information about a certain company. One application (stock ticker) in the group may show changes in stock values of the company, and another application (news reader) in the group may display news updates related to that company.

In one embodiment, the user groups the applications 202A through 202N by providing user inputs to the computing device 110 via the input module 116. The grouping of the two or more applications 202A through 202N may be performed by selecting the two or more applications and then clicking a mouse button to prompt a pop-up menu associated with the selected applications. The applications selected for a group may be different applications (for example, a group may include a stock ticker widget and a news reader widget). Commands such as 'grouping' may then be selected from the pop-up menu to group the two or more applications. In another embodiment, the applications 202A through 202N may be grouped by checking boxes provided on the windows of the applications. The user may also provide inputs indicating (i) the first application to become the foreground application, (ii) a sequence by which the applications 202A through 202N is to become the foreground application, (iii) a time interval before changing the foreground application to the next application, and/or (iv) any events that override the sequence causing a certain application to become the foreground application immediately.

The operating system 212 manages hardware and software resources of the computing device 110. In the example of FIG. 2, the operating system 212 includes a window manager 214, an input driver 216, and a display driver 218. The window manager 214 is a software component that is responsible for generating and displaying the windows of applications on the screen of the display module 118. The window manager 214 allows the user to perform various operations on the windows including, among other operations, changing the size of the windows and overlaying one window on top of other windows. The window manager 214 operates in conjunction with the application display organizer 210 to generate images for windows on the screen of the display module 118. The input driver 216 is a conventional software component for managing user inputs received via the input module 116. The display driver 218 is a conventional software component for managing displays on the screen of the display module 118. The input driver 216 and the display driver 218 may be standard components provided in the operating system 212.

Figure 3:
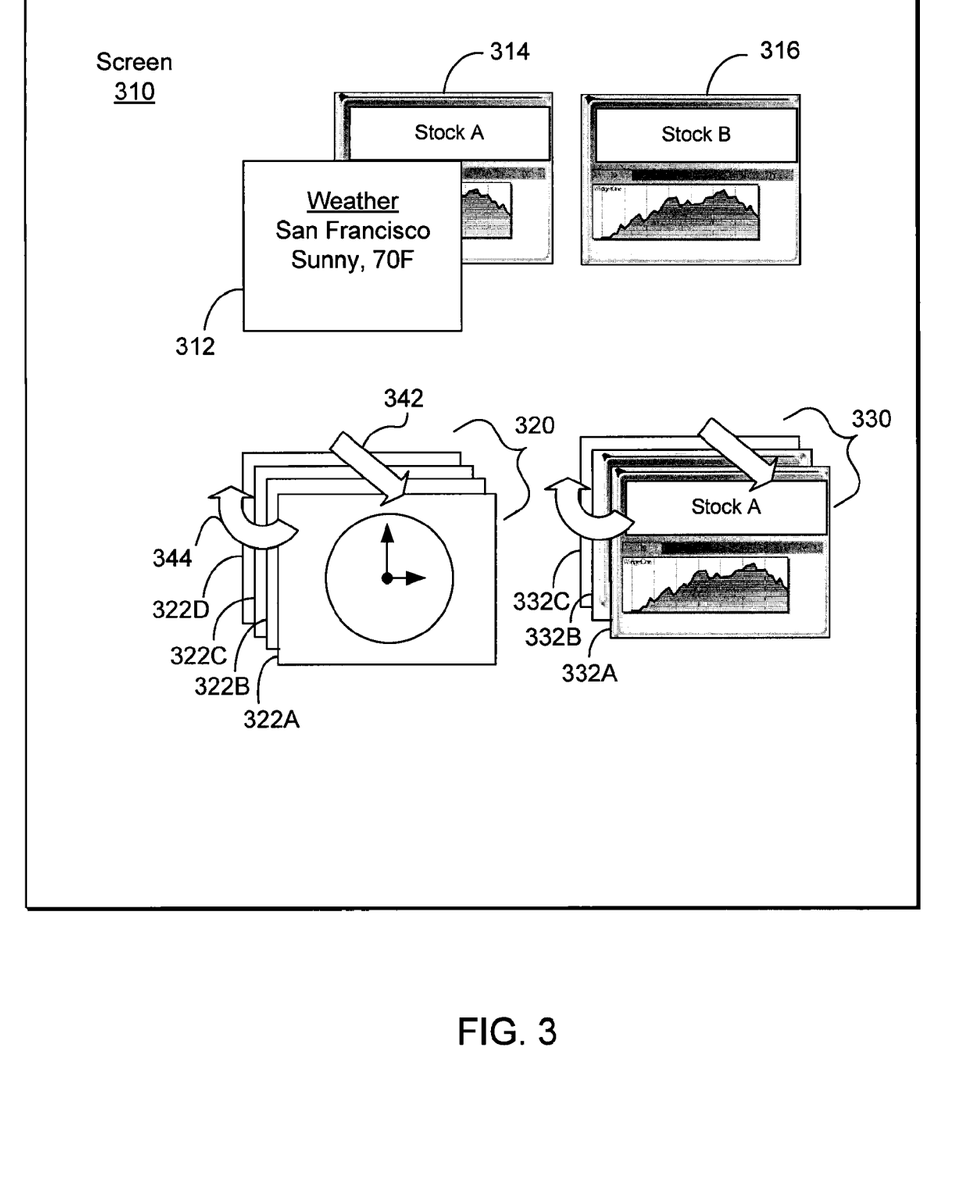
FIG. 3 illustrates a screen of the computing device displaying groups of applications, according to one embodiment of the present invention.

FIG. 3 illustrates a screen 310 of the display module 118 running multiple applications, according to one embodiment of the present invention. A first group 320 of applications, a second group of applications 330, and ungrouped applications 312, 314, 316 are illustrated in FIG. 3. The first group 320 includes four applications, and the second group 330 includes three applications.

Each group of applications 320, 330 is associated with a single foreground window 322A, 332A on the screen 310. The foreground window 322A, 332A displays images associated with one foreground application of the group. The images for other applications in the group (i.e., background applications) are not displayed in the foreground window. In one or more embodiments, the images for the background applications are displayed instead on background windows 322B through 322D, 332B, 332C.

The foreground application for each group changes, and thus the information displayed in the foreground window of the group changes accordingly. By changing the foreground application in the group, the user is presented with images of different applications in the same foreground window 322A, 332A. In this way, the user can view and interact with multiple applications in the group via the same window 322A, 332A, thereby reduces or eliminates the need to clutter the screen with windows for numerous applications.

In one embodiment, the foreground application changes sequentially as the time progresses in a slideshow manner. For example, when a group is configured to include four applications A, B, C, and D, these four applications may take turns to become the foreground application in a sequential manner. That is, after application A becomes the foreground application, application B may then become the foreground application. Then application C becomes the foreground application followed by application D. After application D becomes the foreground application, the same sequence restarts, making application A the next foreground application. The same sequence is repeated until an overriding event is detected or the group is disbanded.

In the example of FIG. 3, the windows 322A through 322D and 332A through 332C in each group 320, 330 are respectively cascaded so that parts of background windows 322B-D and 322B-C in the groups 320, 330 are visible on the screen 310. Cascading the windows is advantageous because it is visible to the user how many applications are included in the group. In another embodiment, the background windows 322B through 322D, 322B, 322C are completely overlaid and occluded by the foreground windows 322A, 332A.

In one embodiment, the sequence according to which the applications 202A through 202N become the foreground application and occupy the foreground window 322A, 332A may be configured or modified by the user. For example, the sequence may be set by the order in which the windows 322A through 322D, 332A through 332C of the applications are stacked by the user. With reference to the example of the group 320 in FIG. 3, a window 322A is stacked on the top followed by a window 322B, a window 322C and a window 322D. This represents the sequence by which the applications become the foreground application and display their images in the foreground window 322A. Specifically, after an application occupies the foreground window 322A, the application is pushed back to the last background window 322D (as represented by an arrow 344). Then the application occupying the foremost background window 322B takes up the foreground window 322A. The application using the window 322C and the application using the window 322D then shift to use the windows 322B and 322C, respectively (as represented by an arrow 342). In one embodiment, such sequence of assigning the applications to the foreground window 322A, 332A is modified by clicking on a window and dragging the window to a different position within the stack of windows 322A-D.

In another embodiment, the sequence according to which the applications 202A through 202N become the foreground application and occupy the foreground window 322A, 332A is set automatically by the application display organizer 210 after the user's definition of the group is received. The application display organizer 210 may generate the sequence randomly or other criteria (e.g., refresh rate of the information from the remote server 108 associated with the applications).

In one embodiment, the foreground application changes periodically as time advances (e.g., every five minutes). The interval of changing the foreground application may be configured by the user. In one embodiment, the time during which an application remains as the foreground application may be set differently for each application. For example, a first application occupies the foreground window for two minutes but a second application occupies the foreground window for ten minutes.

In another embodiment, an application detects an event that overrides the sequence for changing the applications. Such events may override a sequence for becoming the foreground application and prompt the application associated with the event to become the foreground application immediately or soon after the event is detected. The events may be receiving of information from the remote server 108 communicating with the computing device 110. For example, the user may set a stock ticker application to become the foreground application when the stock value hits a certain value. When the stock value hits the value, the stock ticker application becomes the foreground application immediately regardless of whether the stock ticker application was next in the sequence to become the foreground application. Alternatively, the event may be user inputs such as clicking of a background window 322B-D, 332B-C or dragging of a background window 322B-D, 332B-C to the top of the foreground window 322A, 332A. The applications associated with the clicked or dragged background window 322B-D, 332B-C may then become the foreground application.

After an event overriding the predefined sequence is detected that causes an application to become the foreground, the sequence of changing the foreground application may be resumed. That is, the application that occupied the foreground window 322A, 332A before detection of the event may become the next foreground application. Alternatively, an application in the sequence following the application prompted by the overriding event may become the next foreground application.

Figure 4:
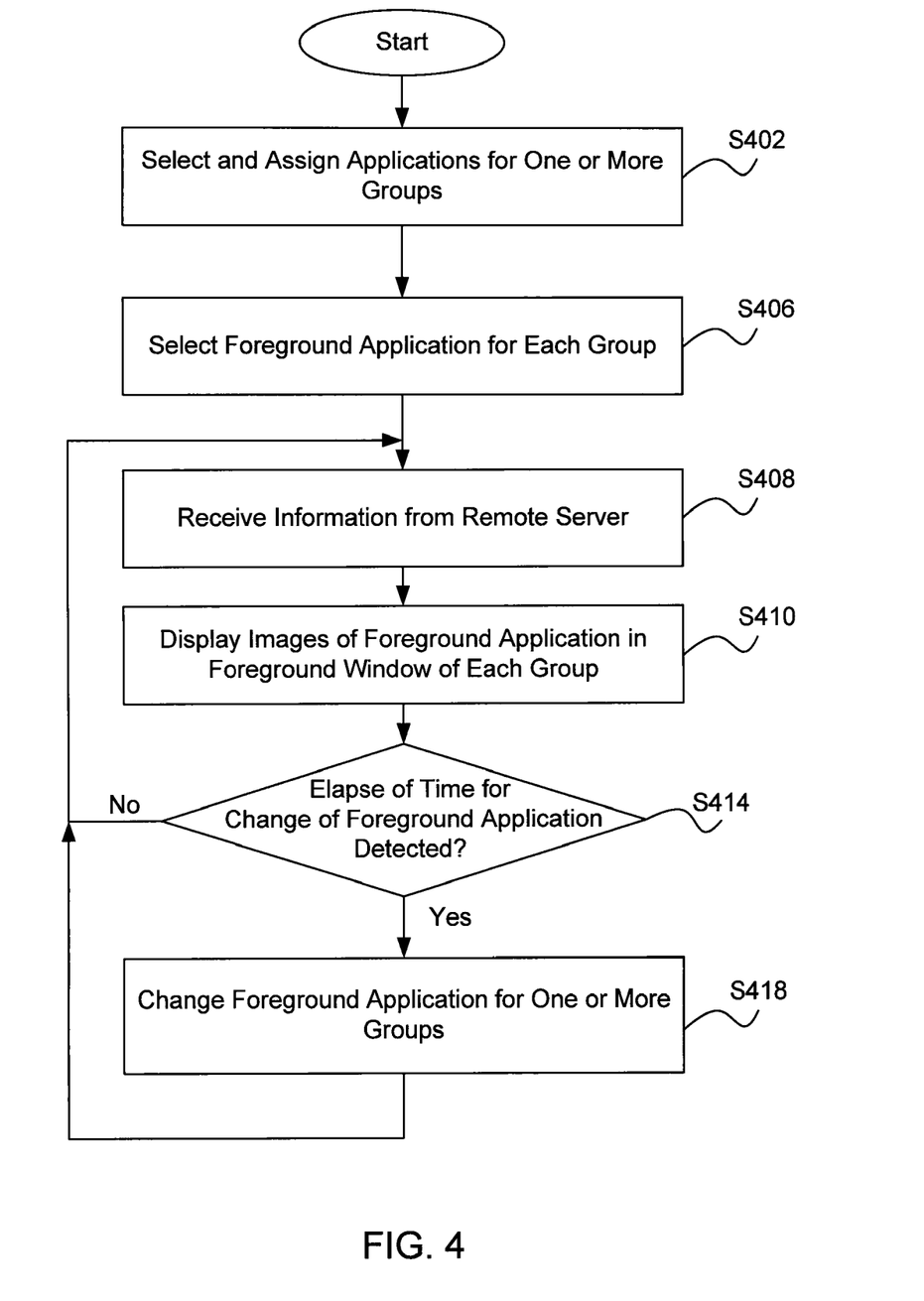
FIG. 4 is a flowchart illustrating a method of displaying images of multiple applications in a foreground window, according to one embodiment of the present invention.

FIG. 4 is a flowchart illustrating a method for displaying images of multiple applications in the foreground window 322A, 332A, according to one embodiment of the present invention. First, the user selects and assigns S402 applications to one or more groups 320, 330 by providing user inputs via the input module 116. The user input is received at the application display organizer 210 to generate one or more groups 320, 330 and store information of the groups 320, 330. Then a foreground application is selected S406 for each group 320, 330. The applications receive S408 information from remote servers. The sequence by which the applications become the foreground application may also set in this step. The images associated with the foreground application are then displayed S410 in the foreground window 322A, 332A on the screen of the display module 118.

After elapse of time is detected S414, the foreground applications for one or more groups 320, 330 are changed S418 to the next application in the sequence. Conversely, if the elapse of time is not detected S414, the foreground application remains unchanged. In this case, the images for the same application are displayed S410 in the foreground window 322A, 332A on the screen of the display module 118.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Upon reading this disclosure, those of ordinary skill in the art will appreciate still additional alternative structural and functional designs for selecting and retrieving the media files at the electronic devices through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer readable non-transitory storage medium storing computer instructions adapted to selectively display images of multiple applications on a screen, the computer instructions when executed configured to cause a processor to:

receive a user-selected definition of a group, the group including two or more different applications and associated with one foreground window and one or more background windows on the screen, the user-selected definition of the group including a sequence by which the different applications are to be displayed in the foreground window;

receive a selection of a first application of the group as a foreground application;

display images of the selected foreground application in the foreground window of the group;

display images of the one or more background windows in a cascaded manner partly overlaid by the foreground window;

change the foreground application of the group from the first application to a second application of the group according to the sequence responsive to detecting elapse of a first predetermined amount of time;

change the foreground application of the group from the second application to a third application of the group according to the sequence responsive to detecting elapse of a second predetermined amount of time different from the first predetermined amount of time; and display images of the changed foreground application in the foreground window of the group at a same location of the screen as the foreground window of the selected foreground application.

2. The computer readable storage medium of claim 1, wherein the two or more different applications comprise widgets.

3. The computer program readable storage medium of claim 1, wherein each of the two or more different applications receives information for display from different remote servers via a network.

4. The computer readable storage medium of claim 1, further comprising computer instructions causing the processor to:

display a pop-up menu responsive to selecting one or more of the different applications;

receive user input associated with the pop-up menu to assign selected one or more of the different applications to a created group; and generate a definition for the created group to include the two or more different applications.

5. The computer readable storage medium of claim 1, wherein the user-selected definition includes the predetermined event for overriding the sequence.

6. The computer readable storage medium of claim 1, wherein the foreground window and the one or more background windows are of a same size.

7. The computer readable storage medium of claim 1, further comprising instructions to:

change the foreground application of the group to a fourth application of the group by overriding the sequence responsive to detecting a predetermined event at the fourth application.

8. The computer readable storage medium of claim 7, wherein the predetermined event comprises receiving information from a remote server associated with the fourth application.

9. The computer readable storage medium of claim 7, wherein the predetermined event comprises receiving of user input indicating selection of the fourth application.

10. The computer readable storage medium of claim 1, wherein the first predetermined amount of time and the second predetermined amount of time are set by a user.

11. A method for selectively displaying images of multiple applications on a screen, comprising:

receiving a user-selected definition of a group, the group including two or more different applications and associated with one foreground window and one or more background windows on the screen, the user-selected definition of the group including a sequence by which the different applications are to be displayed in the foreground window;

receiving a selection of a first application of the group as a foreground application;

displaying images of the selected foreground application in the foreground window of the group;

displaying images of the one or more background windows in a cascaded manner partly overlaid by the foreground window;

changing the foreground application of the group from the first application to a second application of the group according to the sequence responsive to detecting elapse of a first predetermined amount of time;

changing the foreground application of the group from the second application to a third application of the group according to the sequence responsive to detecting elapse of a second predetermined amount of time different from the first predetermined amount of time; and displaying images of the changed foreground application in the foreground window of the group at a same location of the screen as the foreground window of the selected foreground application.

12. The method of claim 11, wherein the two or more different applications comprise widgets.

13. The method of claim 11, further comprising:

the first application receiving information from a first server for display on the screen; and the second application receiving information from a second server for display on the screen.

14. The method of claim 11, further comprising:

displaying a pop-up menu responsive to selecting one or more of the different applications;

receiving user input associated with the pop-up menu to assign selected one or more of the different applications to a created group; and generating a definition for the created group to include the two or more different applications.

15. The method of claim 11, further comprising including the predetermined event for overriding the sequence in the user-selected definition.

16. The method of claim 11, wherein the foreground window and the one or more background windows are of a same size.

17. A computing device comprising a processor for executing multiple applications simultaneously, comprising:

a user input module for receiving a user-selected definition of a group, the group including two or more different applications and associated with one foreground window and one or more background windows, the user-selected definition of the group including a sequence by which the different applications are to be displayed in the foreground window;

an application display organizer connected to the user input module for selecting a first application in each group as a foreground application, the application display organizer changing the foreground application of the group from the first application to a second application of the group according to the sequence responsive to detecting elapse of a first predetermined amount of time, the application display organizer changing the foreground application of the group from the second application to a third application of the group according to the sequence responsive to detecting elapse of a second predetermined amount of time different from the first predetermined amount of time, the application display organizer displaying images of the changed foreground application in the foreground window of the group at a same location of the screen as the foreground window of the selected foreground application; and a display driver connected to the application display organizer, the display driver generating images for the foreground window of the group and the background windows of the group on a screen, the images of the one or more background windows in a cascaded manner partly overlaid by the foreground window.

18. The computing device of claim 17, wherein the two or more different applications comprise widgets.

19. The computing device of claim 17, further comprising a communication interface connected to the application display organizer, the two or more different applications receiving information from different remote servers via the communication interface.

20. The computing device of claim 17, wherein the application display organizer is configured to:
- display a pop-up menu responsive to selecting one or more of the different applications;
- receive user input associated with the pop-up menu to assign selected one or more of the different applications to a created group; and
- generate a definition for the created group to include the two or more different applications.

21. The computing device of claim 17, wherein the application display organizer is configured to include the predetermined event for overriding the sequence in the user-selected definition.

22. The computing device of claim 17, wherein the foreground window and the one or more background windows are of a same size.

\* \* \* \* \*